United States Patent
Roth

[11] 3,912,845
[45] Oct. 14, 1975

[54] ARTICLE COMPRISING A SUBSTRATE COATED WITH AN AMINOBENZENESULFONAMIDE-ALDEHYDE INTERPOLYMER INTUMESCENT COMPOSITION

[75] Inventor: Shirley H. Roth, Highland Park, N.J.

[73] Assignee: Cities Service Oil Company, Tulsa, Okla.

[22] Filed: Jan. 21, 1974

[21] Appl. No.: 435,061

Related U.S. Application Data
[62] Division of Ser. No. 291,846, Sept. 25, 1972, abandoned.

[52] U.S. Cl............ 428/524; 106/15 FP; 260/72.5; 260/DIG. 24; 427/195; 427/374; 428/460; 428/529; 428/531; 428/921
[51] Int. Cl.² .................. C09D 5/18; C09K 3/28
[58] Field of Search.................. 260/72.5, DIG. 24; 117/136, 161 LN, 161 UT; 427/195, 374; 428/460, 524, 529, 531, 921; 106/15 FP; 252/8.1

[56] References Cited
UNITED STATES PATENTS
| | | | |
|---|---|---|---|
| 2,771,379 | 11/1956 | DiDario | 117/136 X |
| 3,535,130 | 10/1970 | Webb | 106/15 |
| 3,536,648 | 10/1970 | Nevers | 117/161 LN |
| 3,663,463 | 5/1972 | Wren | 117/136 X |
| 3,702,841 | 11/1972 | Sawko | 117/136 X |

FOREIGN PATENTS OR APPLICATIONS
| | | | |
|---|---|---|---|
| 699,531 | 11/1953 | United Kingdom | 117/141 |

OTHER PUBLICATIONS
Chem. Abstracts, Vol. 42, 6577c, Kuwata et al., (1948).
Chem. Abstracts, Vol. 45, 7974a, Fujiwara, (1951).
Chem. Abstracts, Vol. 50, 7856h, Camps, (1956).
Chem. Abstracts, Vol. 54, 5089a, Briggs, (1960).
Chem. Abstracts, Vol. 74, 108586n, Donaruma et al., (1971).
J. Med. Chem., Vol. 9, pps. 258–259, Donaruma et al., (1966).
J. Med. Chem., Vol. 10, pps. 963–964, Dombroski et al., (1967).

*Primary Examiner*—Harry J. Gwinnell
*Attorney, Agent, or Firm*—Patricia J. Hogan

[57] ABSTRACT

Intumescent compositions of the invention comprise amide-aldehyde interpolymers wherein at least half of the amine units are derived from a sulfanilamide-type compound and preferably correspond to the formula:

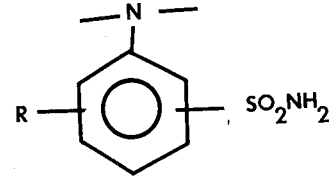

wherein R is hydrogen, alkyl, haloalkyl, alkoxy, haloalkoxy, halo, nitro, acetamido, or sulfonamido. The remainder of the amine units, if any, are derived from urea, thiourea, ethyleneurea, melamine, guanidine, aminoguanidine, cyanamide, and/or dicyandiamide; and the aldehyde units are derived from an alkanal containing 1-5 carbon atoms. Compositions wherein the interpolymer is a sulfanilamide-formaldehyde copolymer are preferred. These compounds are coated onto substrates in any suitable manner to provide the articles of the invention.

10 Claims, No Drawings

ARTICLE COMPRISING A SUBSTRATE COATED WITH AN AMINOBENZENESULFONAMIDE-ALDEHYDE INTERPOLYMER INTUMESCENT COMPOSITION

This is a division of application Ser. No. 291,846, filed Sept. 25, 1972, now abandoned.

BACKGROUND OF THE INVENTION

1. Field of the Invention

This invention relates to intumescent compositions and more particularly relates to such compositions comprising an aminealdehyde interpolymer as an intumescent agent.

2. Description of the Prior Art

It is known that a substrate may be protected from heat and fire by the application of an intumescent compositions. Intumescent compositions of the prior art usually contain an intumescent agent having at least three components, i.e., a carbonific, a spumific, and a catalyst; and they are typically characterized by the disadvantages of high cost, low spreading rate, relatively poor efficiency, poor water resistance, and poor weatherability. Those which form clear coatings have the additional disadvantages of crazing and poor storage stability.

SUMMARY OF THE INVENTION

An object of this invention is to provide novel intumescent compositions.

Another object is to provide novel intumescent compositions which form clear coatings.

A further object is to provide such compositions having good efficiency and a low level of moisture sensitivity.

These and other objects are attained by using as intumescent agents amine-aldehyde interpolymers wherein the aldehyde units are residues of an alkanal containing 1–5 carbon atoms and at least half of the amine units are residues of an amine corresponding to the formula:

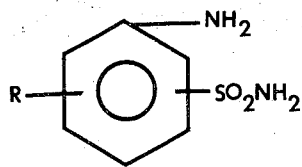

wherein R is hydrogen, alkyl, haloalkyl, alkoxy, haloalkoxy, halo, nitro, acetamido, or sulfonamido.

DESCRIPTION OF THE PREFERRED EMBODIMENTS

The intumescent agents of the invention may be any such amine-aldehyde interpolymers but are preferably such interpolymers having number average molecular weights of about 350–2,000. They may be the sulfanilamide-formaldehyde type interpolymers of the prior art or, preferably, the interpolymers of copending application Ser. No. 291,847, filed Sept. 25, 1972, now abandoned, in the name of Shirley H. Roth, the teachings of which are incorporated herein by reference.

As indicated above, at least half of the total amine units of the interpolymers are residues of a sulfanilamide-type compound, i.e., a substituted or unsubstituted o-, m-, or p-aminobenzenesulfonamide. When the sulfanilamide-type compound bears an organic substituent, it is preferred that the substituent contain 1–5 carbon atoms. When halo substituents are present, it is preferred that they be chloro or bromo. Exemplary of the amines from which these units may be derived are sulfanilamide, o-aminobenzenesulfonamide, m-aminobenzenesulfonamide, 4-amino-2-ethylbenzenesulfonamide, 2-amino-3-chloromethylbenzenesulfonamide, 2-amino-3-butoxybenzenesulfonamide, 3-amino-2-butoxybenzenesulfonamide, 4-amino-3-bromomethoxybenzenesulfonamide, 4-amino-2-chlorobenzenesulfonamide, 2-amino-4-bromobenzenesulfonamide, 4-amino-2-nitrobenzenesulfonamide, 4-amino-2-acetamidobenzenesulfonamide, 4-amino-1, 3-disulfonamidobenzene, etc., and mixtures thereof. Preferably these units are units of sulfanilamide itself.

If desired, the interpolymer may be one in which up to half of the amine units are units derived from a co-condensable amine. Suitable co-condensable amines include, e.g., urea, thiourea, ethyleneurea, melamine, guanidine, aminoguanidine, cyanamide, dicyandiamide, etc., and mixtures thereof.

As indicated above, the aldehyde units of the interpolymer are derived from an alkanal containing 1–5 carbon atoms, i.e., formaldehyde, acetaldehyde, propionaldehyde, butyraldehyde, pentaldehyde, and mixtures thereof.

For use in protecting a substrate from heat and fire, the intumescent agents of the invention may be applied in any suitable manner, e.g., electrodeposition, spraying of powdered intumescent agent onto an adhesive substrate, spraying of powdered intumescent agent onto a substrate to which it is adhered by subsequent melting and cooling, application of a hot melt, application of a paint, etc. The intumescent agent may be the sole ingredient of the intumescent composition, or it may be used in conjunction with other ingredients. For example, it may be compounded with another film-forming binder, e.g., nitrocellulose, and/or with one or more of the other ingredients conventionally used in intumescent compositions, e.g., plasticizers, stabilizers, dispersing agents, pigments, driers, biocides, antifoamers, thickeners, protective colloids, fillers, blowing agents, etc., and/or with other intumescent agents. The intumescent agent of the invention should comprise at least 10% by weight of the total intumescent composition. The intumescent composition may be dispersed in a suitable liquid medium, e.g., water or a solvent or solvent mixture, to form a paint having a solids content of about 10–90% by weight. Ordinarily the intumescent agent is applied to a substrate so as to deposit a coating having a dry thickness of about 0.001–0.75 inch.

The intumescent agents of the invention are efficient, have low moisture sensitivity, and intumesce to form foams having good volume, cell structure, and adherence to substrates, such as wood, paper, metal, and plastics. The preferred intumescent agents have the additional advantage that they can form clear coatings.

The following examples are given to illustrate the invention and are not intended as a limitation thereof. The sulfanilamideformaldehyde copolyer of Examples I and II is a copolymer prepared in a strongly acidic medium in accordance with the teachings of the prior art. The sulfanilamide-formaldehyde interpolymers of Examples III-V are interpolymers prepared in accordance with the teachings of the aforementioned copending application Ser. No. 291,847 so that the sulfanilamide units correspond to the formula:

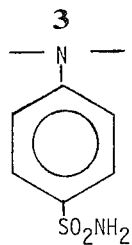

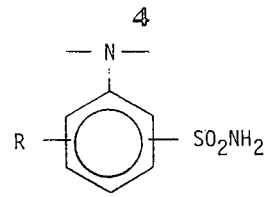

EXAMPLE I

Place a sample of sulfanilamide-formaldehyde copolymer A in an aluminum pan and flame it with a propane torch. The copolymer intumesces to form a good volume of foam.

EXAMPLE II

Dissolve equal parts by weight of melamine resin and sulfanilamide-formaldehyde copolymer A in dimethylsulfoxide, cast the solution, and strip off the solvent to form a clear, water-white film. The film intumesces well when flamed with a propane torch.

EXAMPLE III

Apply a hot melt of sulfanilamide-formaldehyde copolymer B to a poplar panel and allow it to cool to form a clear, hard, pale yellow coating. The coating exhibits excellent intumescence when flamed with a natural gas flame.

EXAMPLE IV

Dissolve a sulfanilamide-urea-formaldehyde terpolymer in dimethylformamide in an aluminum pan and then drive off the solvent to form a clear, pale yellow film. The film intumesces very well when flamed with a propane torch.

EXAMPLE V

Dissolve 36 g. of sulfanilamide-formaldehyde copolymer B in 101 g. of 2-methoxyethanol and then dissolve 12.9 g. of 70% solids nitrocellulose (30% ethanol) in the solution. Paint the resulting composition on a poplar panel and oven dry to form a clear film having a good appearance. The film intumesces when flamed with a propane torch.

It is obvious that many variations may be made in the products and processes set forth above with departing from the spirit and scope of this invention.

What is claimed is:

1. An article which comprises a substrate coated with an intumescent composition comprising an interpolymer of at least one amine with an alkanal containing 1–5 carbon atoms; at least half of the combined amine units of the interpolymer corresponding to the formula:

wherein R is hydrogen, alkyl, haloalkyl, alkoxy, haloalkoxy, halo, nitro, acetamido, or sulfonamido.

2. The article of claim 1 wherein up to half of the combined amine units of the interpolymer are residues of urea, thiourea. ethyleneurea, melamine, guanidine, aminoguanidine, cyanamide, dicyandiamide or mixtures thereof.

3. The article of claim 1 wherein the interpolymer has a number average molecular weight of about 350–2,000.

4. The article of claim 1 wherein R is hydrogen.

5. The article of claim 1 wherein at least half of the combined amine units are sulfanilamide units.

6. The article of claim 1 wherein all of the combined amine units of the interpolymer correspond to the formula:

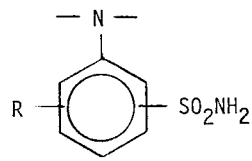

wherein R is hydrogen, alkyl, haloalkyl, alkoxy, haloalkoxy, halo, nitro, acetamido, or sulfonamido.

7. The article of claim 6 wherein R is hydrogen.

8. The article of claim 6 wherein all of the combined amine units of the interpolymer are sulfanilamide units.

9. The article of claim 1 wherein the alkanal is formaldehyde.

10. The article of claim 1 wherein the alkanal is formaldehyde and all of the combined amine units of the interpolymer correspond to the formula:

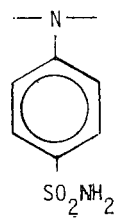

* * * * *

UNITED STATES PATENT OFFICE
CERTIFICATE OF CORRECTION

Patent No. 3,912,845                    Dated October 14, 1975

Inventor(s) Shirley H. Roth

It is certified that error appears in the above-identified patent and that said Letters Patent are hereby corrected as shown below:

Page 1, left hand column, line 7, the Assignee should read --Cities Service Company--. Page 1, right hand column, line 14, "amide-aldehyde" should read --amine-aldehyde--; page 1, right hand column, last sentence, "compounds" should read --compositions--.

*Signed and Sealed this*

*twenty-seventh* Day of *January 1976*

[SEAL]

Attest:

RUTH C. MASON
*Attesting Officer*

C. MARSHALL DANN
*Commissioner of Patents and Trademarks*